United States Patent [19]

McAllister et al.

[11] Patent Number: 4,656,095

[45] Date of Patent: Apr. 7, 1987

[54] ABLATIVE COMPOSITION

[75] Inventors: Lawrence E. McAllister, Dayton; John E. Hill, Jr., Biddeford, both of Me.

[73] Assignee: Fiber Materials, Inc., Biddeford, Me.

[21] Appl. No.: 615,586

[22] Filed: May 31, 1984

[51] Int. Cl.$^4$ ............................................... C08K 3/18
[52] U.S. Cl. ................................... 428/413; 427/386; 523/179; 523/435; 523/445
[58] Field of Search ............... 523/179, 435, 445, 468; 428/413; 106/18.13, 18.26, 18.27; 427/386

[56] References Cited

U.S. PATENT DOCUMENTS

| 3,600,341 | 8/1971 | Schmidt et al. | 524/36 |
| 3,875,106 | 4/1975 | Lazzaro | 523/179 |
| 4,001,126 | 1/1977 | Marion et al. | 523/435 |
| 4,289,680 | 9/1981 | Kimura | 524/405 |

Primary Examiner—Lewis T. Jacobs
Attorney, Agent, or Firm—Schiller, Pandiscio & Kusmer

[57] ABSTRACT

In a coating composition for application to a substrate for curing thereon to form an ablative coating of the type including a reactive mixture of epoxy and polysulfide resins, an amine curing agent, and inorganic materials serving as a source of one or more Lewis acids and being capable of forming a glassy reaction product when exposed to heat, the improvement comprising adding carbonaceous pre-ox fibers thereto in a weight amount between about 15 to 40%. When applied to a substrate, the solvent-free composition cures to a tightly adhering, flexible coating capable of providing thermal protection in a very high temperature, erosive environment.

8 Claims, No Drawings

ABLATIVE COMPOSITION

This invention relates to coatings based on polymeric resins and more particularly to an ablative self-curing polymeric coating composition.

Distinction should be made among flame resistant, flame retardant and ablative materials. Flame resistant materials can be defined as those which will not burn on contact with a flame, or if ignited will not propagate fire. For example, ceramic and cementitious materials, structural metals and the like are considered to be flame resistant.

Flame retardant material, on the other hand, can be defined as that which when exposed to a flame, will ignite but will propagate the fire reluctantly or very slowly. The examples are a number of synthetic polymers such as those described for example in U.S. Pat. No. 3,783,133, U.S. Pat. No. 3,514,424, U.S. Pat. No. 3,748,317, U.S. Pat. No. 3,524,901 and many others.

Ablative materials are flame retardant in the sense that, when exposed to heat they burn, if at all very slowly, ablative materials exhibit properties beyond mere flame retardancy. When ablative material is exposed not only to heat but to the erosive effects of a blast or stream of hot gas or plasma, energy is locally absorbed from the hot gas by melting or vaporization occuring at the surface of the ablative material. The melted or vaporized material tends to form a fluid boundary layer which prevents the hot gas flow from directly impinging on the ablative material, decreases the value of the gas-film coefficient and reduces the gas temperature near the material. Of course, all of the foregoing depends on the nature of the flame or hot gas, particularly its chemistry and most importantly its temperature. For example, materials such as zirconia which is considered a flame proof material at the relatively modest heat of a match flame, is used as an ablative liner in rocket nozzles in which the temperatures can be several thousand degrees. The materials of interest in the present invention are materials which are considered fire retardant and ablative to flame at temperature of at least 2000 degrees F. and above.

Ablative coating materials are used to protect various substrates from flame damage. Exemplary of such substrates are the firewalls in aircraft, ships and many buildings; the airframes of aircraft from which rockets are fired; the decks and superstructures of naval vessels; and landbased rocket launchers. Ablative coatings for such substrates must exhibit good adhesion, flexibility and environmental stability in addition to providing the necessary flame protection.

A number of different types of commercially available ablative coating materials are primarily based on silicone rubbers, epoxy resins, polyurethane resins or fluorocarbon elastomers. The silicones are relatively expensive and do not exhibit a satisfactory combination of ablative and erosion prevention performance; and the epoxies are generally too rigid to provide good thermal strain compatibility with most substrates. Polyurethanes, in addition to exhibiting poor thermal stability, form toxic degradation products. Finally, the fluorocarbons are expensive and must be applied from soultions having low solids content, a fact that makes it necessary to remove large amounts of volatile solvents and limits the coating thickness which can be achieved in any one application. There is, therefore, a real need for an improved ablative coating capable of protecting various substrates in an ablative environment.

It is therefore a primary object of this invention to provide an improved ablative coating composition which can be applied to various substrates to protect the substrates from flame. It is another object to provide a coating composition of the character described which is relatively inexpensive, has a long shelf-life of components prior to final mixing, and is easily and rapidly applied. Still a further object is to provide an ablative coating composition which is flexible enough to provide good thermal strain compatibility, exhibits good thermal stability, achieves a tight bond with a wide range of surfaces, requires no solvent removal and is selfcuring. Other objects of the invention will in part be obvious and will in part be apparent hereinafter.

The invention accordingly comprises the composition possessing the features, properties, and the constituents, and the article which possesses the characteristics, properties and relation of elements, all as exemplified in the detailed disclosure hereinafter set forth, and the scope of the invention will be indicated in the claims.

In Applicant's U.S. patent application Ser. No. 243,608, filed Mar. 13, 1981, there is disclosed a coating composition suitable for application to a substrate for curing thereon to form an ablative coating. The composition comprises a reactive mixture of an epoxy resin and a polysulfide resin in which the epoxy resin makes up at least 25% by weight of the total resin content. The mixture is self-curing and provides a tough, adherent coating which will form a char when exposed to a high temperature flame. The composition also contains an amine curing agent for the reactive resin mixture, and a mixture of finely divided inorganic materials providing a source of one or more Lewis acids and being capable of forming a glassy reaction product to stabilize the char. Importantly, the mixture also includes short or chopped refractory fibers, which retain their fibrous structure during formation of the char. That composition may also optionally contain a flattening agent and one or more low density fillers.

The refractory fibers used in the composition taught in U.S. patent application Ser. No. 243,608 are silica, ceramics such as aluminum, zirconia silicon carbide etc., and particularly carbon and graphite. Such refractory fibers generally comprises as much as twenty percent by weight of the composition, and being relatively expensive, can constitute a major cost impediment to wide use of the composition. The present invention constitutes a novel improvement over the composition disclosed in U.S. patent application Ser. No. 243,608 in that, despite the requirement in the latter that the fibers be refractory, it has now unexpectedly been found that carbonaceous "pre-ox" fiber can be substituted in whole or in part for such refractory fibers.

In typical prior art manufacturing of refractory carbon graphite fibers, a precursor carbonaceous fiber is employed to provide a structure with aligned polymer chains. While acrylic material, particularly polyacrylonitrile (PAN), is often preferred as carbon-fiber precursor material, inter alia because it does not melt prior to pyrolytic decomposition, and the graphite fibers produced from PAN have substantially greater strength than fibers produced from other inexpensive precursors such as pitch or regenerated cellulose-based materials, for purposes of preparing the ablative coating taught in U.S. patent application Ser. No. 243,608, the nature of the precursor is not important except from a cost standpoint. Where the precursor is PAN, the fibers are oxidized by heating in an oxygen-containing atmosphere to approximately ten weight percent oxygen content, thereby stabilizing the structure for further heating in subsequent carbonizing and graphitizing steps. These fibers, containing about ten weight percent oxygen, are termed "pre-ox" fibers. Apparently the polymer chains in the fiber intermolecularly link during oxidation to form a ladder structure. To form pre-ox fibers, the precursor needs only to be heated in air, e.g. from 200° to 400° C., until the desired oxygen content is obtained. Because PAN fibers are quite inexpensive and the heat treatment is very simple, carbonaceous pre-ox fibers are considerably less costly than refractories. For example, currently oxidized PAN fiber is valued at about $6.00/lb. as compared to about $22.00/lb. for carbon fibers prepared from a pitch precursor, (Thornel VME available commercially from Union Carbide Corp.), and over $30.00/lb for carbon fibers prepared from PAN.

As in U.S. patent application Ser. No. 243,608, the resin system of the present invention comprises Components A and B which when mixed provide a coating composition suitable for application to a substrate for curing thereon to form an ablative coating. Component A includes a liquid polysulfide resin, an amine curing agent, and short pre-ox fibers. Component B comprises a liquid epoxy resin, a mixture of finely divided inorganics providing a source of one or more Lewis acids and being capable of forming a glassy reaction product when the coating is exposed to an ablative/erosion environment, and short refractory fibers. The compositions of Components A and B are so adjusted that when mixed to form the coating composition the epoxy resin makes up at least 25% by weight of the total resin content; the amine curing agent is present in an amount between about 5% and 15% and inorganic materials amount to between about 20% and about 25% by weight of the total resin content; and the fibers amount to between about 25% and 40% by weight of the total resin content, with the major portion of the fibers being in Component A. Blending of these two liquid components, each being relatively inactive per se or inert, gives rise to the coating composition of this invention as they react with one another.

The inert composition making up Component A comprises the polysulfide resin, the curing agent for the resin mixture and a portion of the pre-ox fibers. The liquid polysulfide resins suitable for Component A may be characterized as long chain aliphatic polymers containing disulfide linkages and being mercaptan-terminated. These resins are commercially available, and one sold by Thiokol Corp. under the tradename LP-3 may be taken as exemplary. This LP-3 polysulfide resin is further identified as having a viscosity of 9.4 to 14.4 poises at 25 degrees C., a mercaptan content of 5.9 to 7.7%, an average molecular weight of 1,565, a pour point of −26 degrees C. and a specific gravity of 1.27 at 25 degrees C.

The role of the polysulfide resin is to impart flexibility and toughness to the cured ablative coating thereby making it possible to apply coatings of effective thickness to existing substrate surfaces of essentially any configuration and to provide good thermal strain compatibility to the coating as it provides protection to the substrate in an ablative/erosion environment.

The amount of polysulfide resin in relation to the amount of epoxy resin used depends upon the degrees of flexibility and toughness desired in the applied coating. The quantity of the polysulfide resin in Component A can be defined as not greater than 56% by weight of the total weight of the reactive resin mixture, i.e., weight of polysulfide resin plus weight of epoxy resin. However, it is desirable to use less than 75% by weight and preferable to use between 40 and 60% of the polysulfide liquid resin by total resin weight.

It is necessary to add the curing agent to Component A since it is reactive with the epoxy resin of Component B. Such curing agents are well known, and among those most commonly used are the primary and tertiary amines. Exemplary of the former is triethylene tetramine which is commercially available as a curing agent. Such a primary aliphatic amine is known to catalyze cross-linking and homopolymerization of the epoxy resin and also to promote the reaction between the mercaptan groups of the polysulfide resin and the epoxide groups of the epoxy resin. Inasmuch as the separate composition components must remain stable over extended periods of time, the amine curing agent should be compatible with the polysulfide resin used.

The amount of the amine curing agent incorporated in Component A is based upon the total weight of the reactive resins, and it may vary between about 5% and 15% of that total weight. A complete rapid cure of the resin system may not occur with less than about 5% curing agent and the use of more than 15% gives rise to excessive exothermicity.

The short pre-ox fibers unexpectedly serve to reinforce and stabilize the coating under high heat flux and erosion environments substantially as well as the far more expensive fully carbonized or graphitized fibers of the prior art. The pre-ox fibers in the composition, when exposed to high heat apparently become refractory without loss of capacity to strengthen and toughen the char formed from subjecting the resins to the high heat. The fibers also contribute to the smooth application of the mixed coating composition to the substrate.

Exemplary of suitable carbon pre-ox fibers are those having diameters of 9 to 14 $\mu$m that have been ground through a 1 mm screen to give a range of aspect ratios of about 10 to 100.

In formulating Component A, the curing agent and fibers are preferably separately blended into the liquid polysulfide resin using any suitable mixing equipment. The resulting mixture is stable and can be stored for prolonged periods of time.

The composition making up Component B comprises the liquid epoxy resin, preferably the glass-forming inorganic particulate material and the remaining fibers. Minor amounts of a flattening agent and of a low-density filler may also be added.

The epoxy resins used are glycidyl ether derivatives of polynuclear phenols. The diglycidyl ethers of bisphenol A are commercially available and particularly suitable for the coating composition of this invention. However, glycidyl ethers of any polynuclear aromatic phenol, including such phenols as resorcinol or novalac phenolic resins may be used. It is believed that the aromatic structure of these epoxy resins contributes to the thermal stability and char yield of the ablative coatings.

Exemplary of an epoxy resin for Component B is the diglycidyl ether of bisphenol A (2,2-bis-(p-(2,3-epoxy propoxy) phenyl) propane) sold as Epon 828 by Shell Chemical Co. This epoxy resin has an epoxy equivalent weight of 185 to 192, a viscosity of 10,000 to 16,000 centipoises at 25 degrees C., a molecular weight of 380 and specific gravity of 1.165. This resin can be diluted with a small amount, e.g., about 10% by weight of butyl glycidyl ether.

In order to keep both Component A and B pourable for mixing, it is desirable to divide the total fibers between these components. It will generally be preferable to add somewhat more than half of the fibers (e.g. up to 65% by weight) to Component A due to the lesser viscosity of the liquid polysulfide resin. Based on the total weight of the reactive resins, it is preferable that the fiber content by weight in the composition formed after mixing Components A and B, should be between about 15% to about 40%. A minor portion of the fibers, e.g. up to about 15 to 20% may be replaced by low-density fillers such as phenolic, glass or carbon microballons, ground cork, pearlite and the like to reduce the density and/or thermal conductivity of the coatings.

As noted above, the relative amounts of epoxy and polysulfide resins depend upon such physical characteristics as toughness and flexibility, balanced against char yield, all as desired in the ablative coating. In keeping with the limit on the amount of polysulfide resin which may be present in Component A, it follows that the weight of epoxy resin incorporated in Component B should be at least 25% by total resin weight, a preferable range being between 40% and 60% of the total resin weight.

To serve as an effective ablative coating it appears necessary to be able to form a stable char, i.e., one which provides an essentially continuous barrier to intense flame heat and which remains adhered to the substrate it is protecting. It seems reasonable to postulate that the formation and maintenance of a stable char accomplishes several functions. Among these are the reduction of mass loss and of the amount of flammable gas released due to pyrolysis, and the lowering of the recession/erosion rate. Although the exact mechanism of char induction is not well understood, it is believed to be catalyzed by the presence of one or more Lewis acids (electron pair acceptors) or precursors of Lewis acids. The Lewis acids are commonly used in formulating fire retardant materials which as noted earlier, should be distinguished from the ablative coatings of this invention. Ablative performance involving rapid char induction and lasting char stability is attained in the coating of this invention through the use of fibers in conjunction with a mixture of glassforming inorganics which also meet the requirement of providing a Lewis acid. Whatever their precise role may be, these glassforming materials produce the desired stabilization of the char. The effect of the presence of such inorganic materials is clearly indicated in the summary of test data given below for the coatings of Examples 1-6. A preferred mixture of inorganic, glass-forming particulate material comprises equal weights of zinc borate and alumina trihydrate. The materials are preferably sized between about 20 $\mu$m and 60 $\mu$m. In combination they are added to Component B in an amount from about 20% to about 25% by total resin weight.

That portion of the total fiber content not added to Component A is added to Component B along with any lowdensity fillers required and any flattening agent which may be considered desirable. The purpose of the flattening agent is to give the final cured coating formed on the substrate a dull, or matte finish. Amorphous silica in minor amounts, e.g., from about 1% to about 2% by total resin weight, is an effective flattening agent.

In formulating Component B, the inorganic particulate materials, the flattening agent, and then the fibers are added separately with intermediate stirring to the liquid epoxy resin.

To prepare the ablative coating composition, components A and B are mixed in proportions to provide the desired ratio of the two resins. Inasmuch as the system becomes chemically active with such mixing, the coating composition should be applied to the substrate (by brushing, trowelling or other suitable techniques) promptly after mixing is completed. The curing reaction is exothermic and the self-curing will be complete in one to several days, depending upon the thickness of the coat applied, as well as on the temperature and humidity of the surroundings.

Inasmuch as the coating composition is made without solvents, it is possible to apply coatings over a wide range of thicknesses; and to cover substrates in place irrespective of their size, contour or location. The coating composition adheres well to essentially any clean surface, and presents in its cured state a pleasant matte-like surface.

The following examples, which are meant to be illustrative and not limiting, are given to further describe this invention and to detail the performance characteristics of the coating under several different test conditions.

In the following examples all parts are by weight and the full volumes of Components A and B are mixed to form the coating composition.

EXAMPLE 1

Component A

A resin mixer was charged with 100 parts of a liquid polysulfide polymer (sold by Thiokol Corp. as LP-3); and 10 parts of triethylene tetramine was thoroughly blended through the resin. Then 30 parts of high-strength, high modulus carbon fibers (Thornel VME) were thoroughly blended into the resin mass.

Component B

A second resin mixer was charged with 100 parts of a liquid epoxy resin (sold by Shell Chemical Co. as Epon 828 and identified as a diglycidyl ether of bisphenol A), and to it were added in sequence with intermediate stirring 25 parts zinc borate, 25 parts alumina trihydrate, 4 parts ultra high surface area amorphous silica and 30 parts of the same high-strength, high-modulus carbon fibers used in Component A.

In the subsequent mixture of Components A and B, the high-strength, high-modulus carbon fibers constituted about 19% of the total weight (14 volume %).

EXAMPLE 2

Components A and B were formulated as in Example 1, except that the high-strength, high-modulus carbon fibers (Thornel VME) were omitted and an equal volume of pre-ox fibers of like size, the fibers having been formed from a PAN precursor, was incorporated into the resin mass.

In each example, all of Components A and B were mixed together and the resulting compositions cast in the same thickness on similar metal substrates. The coatings were allowed to achieve full cure over several days at ambient temperature and humidity. The coatings were tested for hardness and specific gravity following cure. Coated substrates were then placed in a vertical mount and subjected to an oxyacetylene torch flame at an impingement angle of 45 degrees, utilizing a flame-to-sample clearance to produce a temperature of about 2800° C. The test involved a seven-second application of the flame followed immediately by an eight-second 50-psi cutting mode.

The effectiveness of cured compositions pre-ox fibers in the used ablative coatings in the erosive environment of the test is determined by measuring the total volume of coating removed and observing the erosion profile of the cross-sectioned substrate. The test results are given in the following Table I.

TABLE I

| Data | Ex. 1 Composition | Ex. 2 Composition |
| --- | --- | --- |
| Hardness (Duro C) | 56 | 51 |
| Specific gravity | 1.48 | 1.41 |
| Erosion test (Wt. loss g.) | 6.69 | 6.88 |
| Erosion rate (cc/sec.) | 0.57 | 0.61 |

The data obtained in these tests indicate that the ablative coating of this invention exhibits substantially the same performance as the coating of the prior art, notwithstanding the substitution of the pre-ox fibers for the refractories.

It will thus be seen that the objects set forth above, among those made apparent from the preceding description, are efficiently attained, and, since certain changes may be made in the composition set forth without departing from the scope of the invention, it is intended that all matter contained in the above description shall be interpreted as illustrative and not in a limiting sense.

We claim:

1. In a coating composition suitable for application to a substrate for curing thereon to form an ablative coating, which composition includes a reactive resin mixture of an epoxy resin and a polysulfide resin in which said epoxy resin makes up at least 25% by weight of the total resin content, said reactive mixture being self-curing to provide a tough, adherent coating which forms a char when exposed to an ablative/erosion environment; an amine curing agent for curing said reactive mixture; and a mixture of finely divided inorganic materials providing a source of one or more Lewis acids and being capable of forming a glassy reaction product to stabilize said char; the improvement wherein
said composition includes short pre-ox fibers which retain their fibrous structure during formation of said char.

2. A coating composition in accordance with claim 1 wherein said finely divided inorganic materials comprise a mixture of zinc borate and aluminum trihydrate present in combination in an amount equivalent to between about 20% and about 25% by weight of said total resin content.

3. A coating composition in accordance with claim 1 wherein said fibers are a polyacrylonitrile oxidized to contain about 10% by weight of oxygen.

4. A coating composition in accordance with claim 1 wherein said fibers are present in amount between about 15% and 40% by weight of the total resin content.

5. A coating composition in accordance with claim 1 wherein said fibers have aspect ratios between about 10 and 100 and diameters of about 14 μm or less.

6. In a combination of a substrate having adhered to the surface thereof an ablative coating characterized as being the polymeric reaction product of a polysulfide resin and an epoxy resin and having distributed therethrough a mixture of finely divided inorganic materials providing a source of one or more Lewis acids and being capable of forming a glassy product when said coating is exposed to a temperature in excess of about 2000 degrees F.;
the improvement wherein said mixture includes carbonaceous pre-ox fibers;
said inorganic materials being present in amount equivalent to between about 25% and about 40% by weight of said reaction product, and
said fiber being present in amount equivalent to between about 15% and about 40% by weight of said reaction product.

7. In a combination as defined in claim 6, the improvement wherein said finely divided inorganic materials are zinc borate and aluminum trihydrate in substantially equal amounts.

8. In a method of protecting a substrate in an ablative/erosion environment, by
(A) applying to the surface of a substrate a coating composition comprising (1) a reactive resin mixture of an epoxy resin and a polysulfide resin in which said epoxy resin makes up at least 25% by weight of the total resin content, (2) an amine curing agent for said reactive mixture, and (3) a mixture of finely divided inorganic materials providing a source of one or more Lewis acids and being capable of forming a glassy reaction product when exposed to said ablative/erosion environment, and
(B) curing said reactive resin mixture under ambient conditions, the improvement including the step of mixing into said materials prior to the cure therof, carbonaneous pre-ox fibers in an amount between about 15% and 40% by weight of the total resin content.

* * * * *